(12) United States Patent
Miura et al.

(10) Patent No.: US 9,486,828 B2
(45) Date of Patent: Nov. 8, 2016

(54) DUAL COATING SYSTEM

(71) Applicants: Fuji Kikai Kogyo Co., LTD., Hiroshima (JP); Toyota Jidosha Kabushiki Kaisha, Toyota-shi, Aichi (JP)

(72) Inventors: Hidenobu Miura, Hiroshima (JP); Masakazu Umehara, Toyota (JP)

(73) Assignees: FUJI KIKAI KOGYO CO., LTD., Hiroshima (JP); TOYOTA JIDOSHA KABUSHIKI KAISHA, Aichi (JP)

( * ) Notice: Subject to any disclaimer, the term of this patent is extended or adjusted under 35 U.S.C. 154(b) by 56 days.

(21) Appl. No.: 14/497,851

(22) Filed: Sep. 26, 2014

(65) Prior Publication Data

US 2015/0007769 A1    Jan. 8, 2015

Related U.S. Application Data

(63) Continuation of application No. PCT/JP2014/001412, filed on Mar. 12, 2014.

(30) Foreign Application Priority Data

May 24, 2013    (JP) .................................. 2013-109927

(51) Int. Cl.
   *B05C 9/04*     (2006.01)
   *B05C 5/00*     (2006.01)
   (Continued)

(52) U.S. Cl.
   CPC ............... *B05C 9/04* (2013.01); *B05C 1/0817* (2013.01); *B05C 1/0826* (2013.01); *B05C 5/005* (2013.01); *B05C 9/12* (2013.01); *B05C 11/1018* (2013.01); *B65H 23/0324* (2013.01);
   (Continued)

(58) Field of Classification Search
   USPC ................. 118/708, 712, 221, 223, 252, 255
   See application file for complete search history.

(56) References Cited

U.S. PATENT DOCUMENTS

| 2005/0201041 | A1 | 9/2005 | Hinoki et al. |
| 2012/0076933 | A1* | 3/2012 | Uematsu ............... B05C 1/0843 427/209 |
| 2012/0103252 | A1 | 5/2012 | Watanabe |

FOREIGN PATENT DOCUMENTS

| JP | 2003-68285 | 3/2003 |
| JP | 2007-29789 | 2/2007 |

(Continued)

OTHER PUBLICATIONS

International Search report for corresponding International Application No. PCT/JP2014/001412, dated Jun. 3, 2014.

*Primary Examiner* — Laura Edwards
(74) *Attorney, Agent, or Firm* — Renner, Otto, Boisselle & Sklar, LLP (57) ABSTRACT

First and second coaters, first and second edge determiners, and first and second moving mechanisms are provided. The first and second coaters apply a coating solution for forming a heat-resistant protection layer onto both surfaces of a substrate on each of which an active material layer is previously formed. The first and second edge determiners determine the locations of lateral edges of the active material layers formed on both surfaces of the substrate to be coated by the respective first and second coaters. The first and second moving mechanisms move the location of the substrate along the width thereof based on the locations of the lateral edges determined by the first and second edge determiners, respectively. The locations of regions of both surfaces of the substrate to be coated are separately adjusted.

5 Claims, 7 Drawing Sheets

(51) Int. Cl.
*B05C 9/12* (2006.01)
*B65H 23/032* (2006.01)
*B05C 1/08* (2006.01)
*B05C 11/10* (2006.01)
*H01M 4/04* (2006.01)
*H01M 4/36* (2006.01)

(52) U.S. Cl.
CPC ...... *B65H 23/0326* (2013.01); *H01M 4/0402* (2013.01); *B05C 1/0839* (2013.01); *B05C 11/1023* (2013.01); *B65H 2301/5114* (2013.01); *B65H 2553/414* (2013.01); *B65H 2557/264* (2013.01); *B65H 2801/72* (2013.01); *H01M 4/366* (2013.01); *Y02E 60/122* (2013.01); *Y02P 70/54* (2015.11)

(56) References Cited

FOREIGN PATENT DOCUMENTS

| | | |
|---|---|---|
| JP | 2010-070334 | 4/2010 |
| JP | 2012-61404 | 3/2012 |
| JP | 2012-130907 | 7/2012 |
| JP | 2005-191070 | 7/2014 |
| WO | WO 2011/001648 A1 | 1/2011 |

\* cited by examiner

DUAL COATING SYSTEM

CROSS-REFERENCE TO RELATED APPLICATIONS

This is a continuation of International Application No. PCT/JP2014/001412 filed on Mar. 12, 2014, which claims priority to Japanese Patent Application No. 2013-109927 filed on May 24, 2013. The entire disclosures of these applications are incorporated by reference herein.

BACKGROUND

The present disclosure relates to dual coating systems that continuously coat both surfaces of a long substrate with a coating solution while feeding the long substrate.

International Patent Publication No. WO2011/001648 describes a dual coating system coating both surfaces of a substrate that will be the core of an electrode material of, for example, a secondary battery or a fuel cell with a coating solution containing active material. The dual coating system includes a die head for front face coating, a die head for back face coating, and a drying oven located downstream of both the die heads in a direction of feed of the substrate. In the dual coating system, both surfaces of the substrate are coated with the coating solution, and the coating solution is then dried to form an active material layer on each surface of the substrate.

The dual coating system includes rotator units and a rotator rotating section. The rotator units each include a pair of rotators between which the substrate is grasped from the front and back surfaces of the substrate, and are each independently provided on a corresponding one of both end portions of the substrate in the widthwise direction of the substrate, and the rotator rotating section individually modifies the orientations of the pairs of rotators of the rotator units with respect to the direction of feed of the substrate. This configuration allows the entire surface of the substrate being fed to be properly kept under outward tension, and allows the substrate to be stably fed without flapping and wrinkling the substrate.

Furthermore, the dual coating system includes end portion location determiners that are laser displacement sensors or sensors. The end portion location determiners can each determine the location of a corresponding one of end portions of the substrate in the widthwise direction of the substrate, and are each provided in the vicinity of a corresponding one of the rotator units and upstream or downstream thereof. International Patent Publication No. WO2011/001648 shows that when a signal from the end portion location determiner is monitored, and the location of the corresponding end portion of the substrate is outside a predetermined range, automatic control is performed to adjust, for example, the orientation of the rotator unit or the rotational speed of a drive roller forming one of the pair of rotators, and automatic correction control can be, therefore, performed such that the amount of the substrate displaced along the width of the substrate falls within the range of set values.

SUMMARY

To prevent shorting between a positive electrode material and a negative electrode material and improve safety, an electrode material structure including a heat-resistant protection layer covering an active material layer is used as the structure of a battery electrode material including the active material layer formed on each surface of a substrate using such a dual coating system as described above. The heat-resistant protection layer and the active material layer are spaced inwardly from both ends of the substrate such that both end portions of the substrate in the widthwise direction remains uncoated so as to be each connected to a lead.

When the electrode material includes the heat-resistant protection layer, there is a demand to precisely form the heat-resistant protection layer on the active material layer, for example, to allow the amount of the heat-resistant protection layer displaced along the width of the substrate to fall within the range of less than or equal to 0.5 mm, to thereby ensure a portion of the substrate that is to be connected to a lead and has an adequately large area while ensuring that the entire surface of the active material layer is covered with the heat-resistant protection layer.

Unfortunately, due to fabrication errors, the active material layer is not necessarily formed in parallel with ends of the substrate in the widthwise direction thereof, and in some cases, regions of both surfaces of the substrate on each of which the active material layer is formed do not completely coincide with each other. For this reason, a dual coating system that controls the substrate based on the locations of the end portions of the substrate to prevent the substrate from meandering as described in International Patent Publication No. WO2011/001648 does not enable the alignment of a heat-resistant protection layer with an active material layer with an adequate degree of precision, and makes it difficult to achieve the quality satisfying such a rigorous demand as described above.

It is therefore an object of the present disclosure to provide a dual coating system capable of forming a second coating layer on each surface of a substrate with high alignment precision with respect to a corresponding one of previously formed first coating layers to fabricate a coated product of high quality.

In order to achieve the object, in the present disclosure, the locations of portions of a substrate to be coated by coaters are moved along the width of the substrate based on the locations of lateral edges of first coating layers previously formed on both surfaces of the substrate, and the locations of coated regions of both surfaces of the substrate to be coated are separately adjusted within a predetermined range.

Specifically, the present disclosure is directed to a dual coating system that feeds a long substrate including a base substrate having both surfaces on each of which a first coating layer is previously formed so as to be spaced inwardly from both lateral ends of the substrate, and simultaneously forms a second coating layer covering the first coating layer on each surface of the substrate so as to be spaced inwardly from both ends of the base substrate, and the following solution is provided.

More specifically, the system according to an aspect of the present disclosure includes: a plurality of guide rollers configured to feed the substrate by a roll-to-roll process; a first coater and a second coater configured to apply a coating solution for forming the second coating layer onto both surfaces of the substrate fed by the guide rollers. The "roll-to-roll process" herein denotes a feeding process in which while the substrate wound into a roll is unwound so as to be intermittently or continuously fed, the fed substrate is wound into a roll after the substrate surfaces have been coated. The first and second coaters are spaced apart from each other along a substrate feed path, and coat the substrate surfaces such that the coating solution covers the first coating layer, and both lateral end portions of the base substrate remain uncoated to form uncoated portions.

The system according to the aspect of the present disclosure further includes: a first moving mechanism configured to move a location of a portion of the substrate to be coated by the first coater along a width of the substrate; a second moving mechanism configured to move a location of a portion of the substrate to be coated by the second coater along the width of the substrate; a first edge determiner configured to determine locations of lateral edges of the first coating layer formed on one of both surfaces of the substrate to be coated by the first coater; a second edge determiner configured to determine locations of lateral edges of the first coating layer formed on the other one of both surfaces of the substrate to be coated by the second coater; and a controller configured to drive the first and second moving mechanisms based on the locations of the lateral edges of the first coating layers determined by the first and second edge determiners, respectively.

In the aspect of the present disclosure, the controller is configured to, when the locations of the lateral edges of the first coating layer determined by the first edge determiner are displaced from reference locations, drive the first moving mechanism to move the substrate along the width of the substrate such that a location of a coated region of one of both surfaces of the substrate to be coated with the coating solution is within a predetermined range with respect to the first coating layer, and when the locations of the lateral edges of the first coating layer determined by the second edge determiner are displaced from reference locations, drive the second moving mechanism to move the substrate along the width of the substrate such that a location of a coated region of the other one of both surfaces of the substrate to be coated with the coating solution is within a predetermined range with respect to the first coating layer. The "reference locations" herein denote the locations of the lateral edges of each first coating layer in a situation where a portion of the first coating layer to be coated by a corresponding one of the coaters is located at a desired location.

According to the aspect of the present disclosure, when the locations of the lateral edges of the first coating layer determined by the first edge determiner are displaced from the reference locations, the first moving mechanism is driven to move the substrate along the width of the substrate. This allows the location of the coated region that will be coated with the coating solution for forming the second coating layer by the first coater to be within a predetermined range with respect to the first coating layer. When the locations of the lateral edges of the second coating layer determined by the second edge determiner are displaced from the reference locations, the second moving mechanism is driven to move the substrate along the width of the substrate. This allows the location of the coated region that will be coated with the coating solution for forming the second coating layer by the second coater to be within a predetermined range with respect to the first coating layer. Thus, the second coating layers are formed on both surfaces of the substrate with high alignment precision with respect to the previously formed first coating layers, thereby fabricating a coated product of high quality.

In the aspect of the present disclosure, the guide rollers may include a direction change roller on which the substrate is wound and which is configured to change the direction of feed of the substrate. In this case, the first and second coaters may be separately located upstream and downstream of the direction change roller.

Furthermore, the first coater may be interposed between the first moving mechanism and the direction change roller along a substrate feed path, and the first moving mechanism may move the substrate along the width of the substrate. The second coater may be interposed between the second moving mechanism and the direction change roller along the substrate feed path, and the second moving mechanism moves the substrate along the width of the substrate.

The first edge determiner preferably determines the locations of the lateral edges of a corresponding one of the first coating layers at a location closer to the first moving mechanism than the first coater. The second edge determiner preferably determines the lateral edges of a corresponding one of the first coating layers at a location closer to the second moving mechanism than the second coater.

A portion of the substrate wound on the direction change roller is less likely to be displaced, and the substrate is displaced along the width of the substrate about the portion of the substrate wound on the direction change roller. Thus, the amount by which a portion of the substrate near the direction change roller is displaced is not so large. In contrast to this, the amount by which a portion of the substrate far from the direction change roller is large. Thus, the first and second edge determiners can ensure the determination of the displacement of the locations of the lateral edges of the first coating layer as compared with when the locations of the lateral edges of the first coating layer are determined in the vicinity of the direction change roller.

The dual coating system according to the aspect of the present disclosure may further include: an unwinder configured to support the substrate wound into a roll, and unwind the substrate toward the guide rollers. One of the first and second moving mechanisms upstream along the substrate feed path preferably includes the unwinder, and an actuator configured to move the rolled substrate supported on the unwinder along the width of the substrate.

With this configuration, the one of the first and second moving mechanisms upstream along the substrate feed path can accurately and rapidly move the substrate along the width of the substrate. The unwinder serves as the one of the first and second moving mechanisms upstream along the path to render the system configuration simpler than with when the one of the first and second moving mechanisms is provided separately from the unwinder.

The dual coating system according to the aspect of the present disclosure may further include: a floating dryer configured to dry the substrate having both surfaces coated with the coating solution for forming the second coating layer; and pairs of nip rollers configured to feed the substrate downstream along the substrate feed path. A corresponding one of the uncoated portions of the substrate may be sandwiched between each pair of the nip rollers from both surfaces of the substrate. The pairs of nip rollers may be each placed on a corresponding one of both lateral ends of the substrate between the floating dryer and one of the first and second coaters downstream along the substrate feed path.

One of the first and second moving mechanisms downstream along the substrate feed path preferably includes the pairs of nip rollers, and an actuator configured to incline rotating shafts of the pairs of nip rollers from orientations of the rotating shafts during usual feed of the substrate to change a direction in which the pairs of nip rollers guide the substrate.

With this configuration, an end portion grasper configured to prevent flapping of the substrate arising from a drying treatment in the floating dryer can include the pairs of nip rollers. The end portion grasper serves as the one of the first and second moving mechanisms to render the system configuration simpler than when the one of the first and second moving mechanisms is provided separately from the end portion grasper.

In the aspect of the present disclosure, the first and second coaters may be gravure kiss coaters.

With this configuration, the thin and smooth coating solution can be uniformly and accurately applied onto the substrate by the first and second coaters with stability.

In the aspect of the present disclosure, the base substrate may be metal foil, and the first coating layer may be an active material layer for a battery. In the aspect of the present disclosure, the coating solution for forming the second coating layer may contain fire retardant material, and the substrate having both surfaces coated with the coating solution may be dried to form a heat-resistant protection layer serving as the second coating layer on each surface of the substrate.

This enables the formation of the heat-resistant protection layer with adequate alignment precision with respect to the active material layer, and enables the fabrication of an electrode material of high quality.

The present disclosure can provide a dual coating system enabling the formation of the second coating layers on both surfaces of the substrate with adequate alignment precision with respect to the previously formed first coating layers, i.e., enabling the fabrication of a coated product of high quality.

DETAILED DESCRIPTION

An embodiment of the present disclosure will now be described in detail with reference to the drawings. The following embodiment is merely a preferred example in nature, and is not intended to limit the scope, applications, and use of the invention.

Embodiment of the Disclosure

Figure 1:
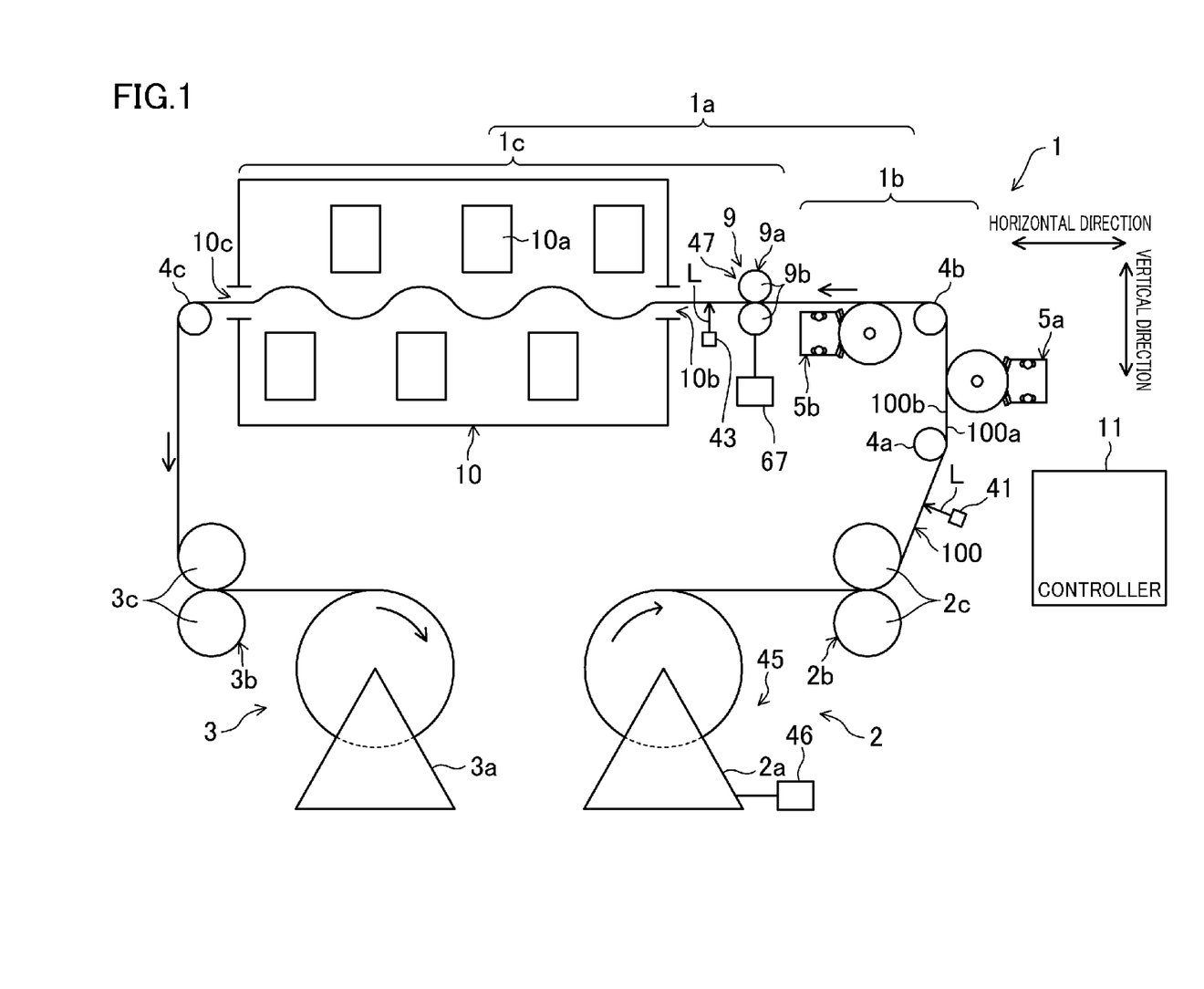
FIG. 1 is a schematic block diagram of a dual coating system according to an embodiment of the present disclosure.

FIG. 1 illustrates a schematic configuration of a dual coating system 1 of the embodiment. As illustrated in FIG. 1, the dual coating system 1 continuously implements a series of treatments in which while a long substrate 100 is fed by a roll-to-roll process, both surfaces 100a, 100b of the substrate 100 being fed are coated with a coating solution, and are then dried.

Figure 7:
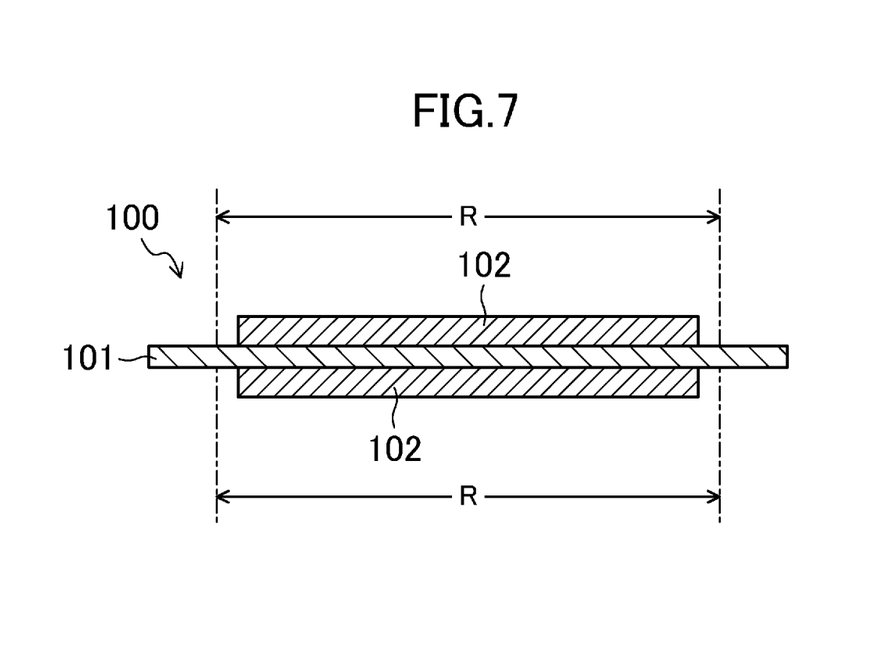
FIG. 7 is a cross-sectional view illustrating a target substrate in the embodiment of the present disclosure.
Figure 8:
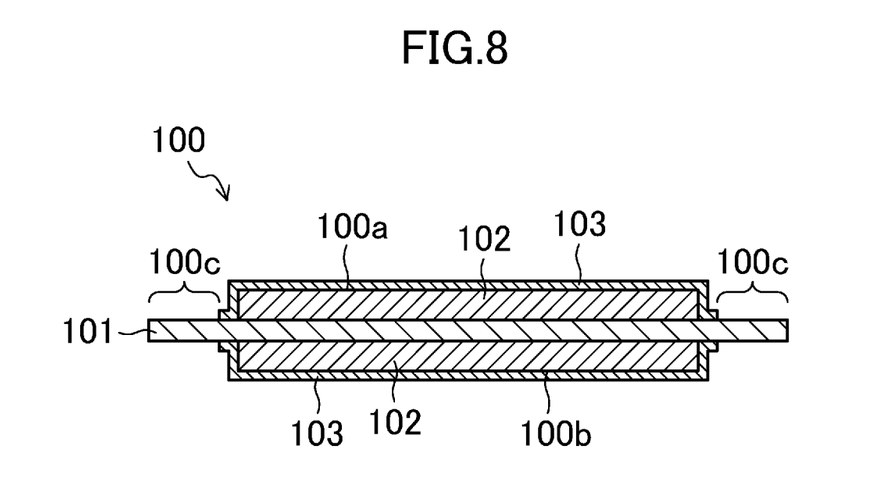
FIG. 8 is a cross-sectional view illustrating a substrate both surfaces of which have been coated using the dual coating system according to the embodiment of the present disclosure.

FIG. 7 illustrates a cross-sectional structure of a target substrate 100 in this embodiment. FIG. 8 illustrates a cross-sectional structure of the substrate 100 both surfaces 100a, 100b of which have been coated using the dual coating system 1. The substrate 100 is a sheet-like preform that forms a battery electrode material. As illustrated in FIG. 7, the substrate 100 includes metal foil (current collector foil) 101 serving as a base substrate, and active material layers 102 previously formed, in the form of first coating layers, on both surfaces of the metal foil 101 and containing graphite as the main ingredient. The active material layers 102 are spaced inwardly (toward a central portion of the metal foil 101) from both ends of the metal foil 101 in the widthwise direction thereof such that portions of the metal foil 101 near both ends thereof remain exposed, and the exposed portions have substantially the same width.

Such a substrate 100 is placed on the dual coating system 1 while being wound into a roll around a core. The dual coating system 1 of this embodiment employs a fire-retardant-material-containing coating solution for forming heat-resistant protection layers 103, and coats both surfaces 100a, 100b of the substrate 100 with the coating solution. Thus, the heat-resistant protection layers 103 are formed in the form of second coating layers. As illustrated in FIG. 8, the heat-resistant protection layers 103 cover the active material layers 102, are spaced inwardly (toward the central portion of the metal foil 101) from both ends of the metal foil 101, and each extend beyond a corresponding one of the active material layers 102 in both lateral directions by, e.g., a width of 2.0±0.5 mm.

As illustrated in FIG. 1, the dual coating system 1 includes an unwinder 2, a winder 3, a plurality of guide rollers 4a, 4b, and 4c, a first coater 5a, a second coater 5b, an end portion grasper 9, a floating dryer 10, and a controller 11.

The controller 11 includes various types of software, such as a control program, and hardware, such as a computer installed with such software, and generally controls the whole dual coating system 1. In other words, the controller 11 controls operations of the unwinder 2, the winder 3, the first coater 5a, the second coater 5b, and the floating dryer 10.

The unwinder 2 includes a support base 2a that supports the rolled substrate 100 and unwinds the substrate 100, and an upstream feed mechanism 2b that feeds the substrate 100 at a predetermined speed and under a predetermined tension in synchronization with the support base 2a. The upstream feed mechanism 2b includes a pair of feed rollers 2c between which both surfaces of the substrate 100 are sandwiched, and rotates the pair of feed rollers 2c in opposite directions to feed the substrate 100 at a fixed speed and under a fixed tension.

The substrate 100 that has been fed from the unwinder 2 is fed while being supported on a plurality of rotatable guide rollers 4a, 4b, and 4c provided in parallel with one another, and is wound around the winder 3 after passing through a treatment zone 1a in which the substrate 100 is coated and dried. The first half of the treatment zone 1a includes a coating zone 1b in which the substrate 100 is coated, and the second half thereof includes a drying zone 1c in which the substrate 100 is dried.

Figure 2:
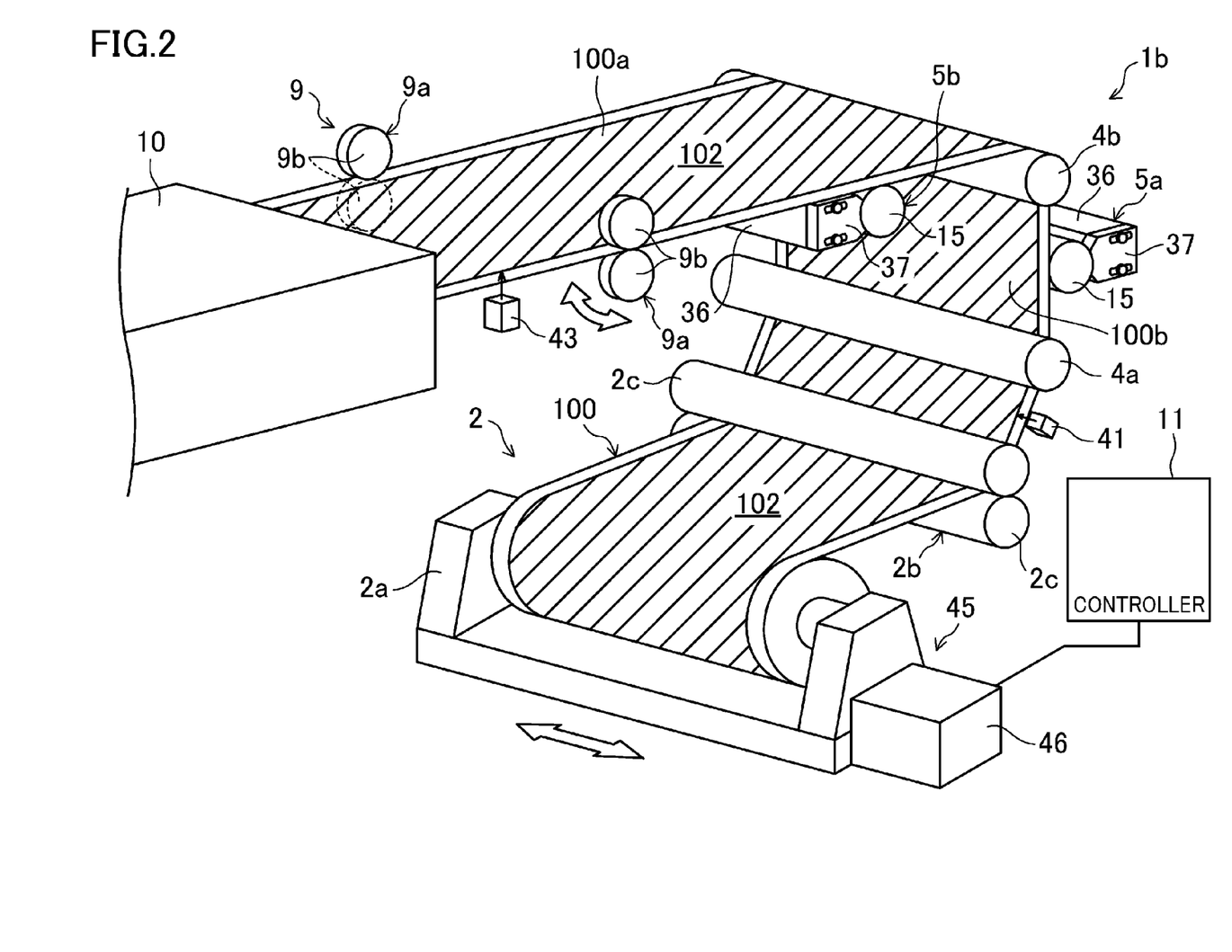
FIG. 2 is a perspective view illustrating a schematic configuration of an unwinder and a coating zone according to the embodiment of the present disclosure.

FIG. 2 illustrates schematic configurations of the unwinder 2 and the coating zone 1b. As illustrated in FIG.

2, the coating zone 1b includes the first guide roller 4a, the second guide roller 4b, the first coater 5a, and the second coater 5b, and the configurations of the guide rollers 4a and 4b and the coaters 5a and 5b render the whole system compact.

Specifically, the first and second guide rollers 4a and 4b are sequentially placed downstream along the feed path of the substrate 100 with a gap formed therebetween in a vertical direction (the top-to-bottom direction), and are located toward the same surface (hereinafter referred to as the second coating surface) 100b of the substrate 100. The second coating surface 100b of the substrate 100 contacts both of the guide rollers 4a and 4b, and the substrate 100 is, therefore, guided to travel vertically upward between the first guide roller 4a and the second guide roller 4b.

The first coater 5a is located between the first guide roller 4a and the second guide roller 4b, and is placed in a direction opposite to the first and second guide rollers 4a and 4b with respect to a portion of the substrate 100 traveling between the guide rollers 4a and 4b. The first coater 5a laterally contacts one surface of the portion of the substrate 100 that travels between the first guide roller 4a and the second guide roller 4b while being strained by applying tension therebetween, i.e., a surface (hereinafter referred to as the first coating surface) 100a of the substrate 100 opposite to the second coating surface 100b, and the first coating surface 100a is coated with the coating solution for forming the heat-resistant protection layers 103 such that the coating solution covers a corresponding one of the active material layers 102, and both end portions of the metal foil 101 in the widthwise direction thereof remain uncoated.

The second guide roller 4b is a direction change roller on which the substrate 100 is wound to change the direction of feed of the substrate 100. The substrate 100 is wound on the second guide roller 4b so as to be guided from a generally vertical direction toward a generally horizontal direction while being strained by applying tension to the substrate 100. The first coating surface 100a is not in contact with the second guide roller 4b. This allows the second guide roller 4b to guide the substrate 100 while supporting the substrate 100 even in a situation where the coating solution applied onto the substrate 100 with the first coater 5a is not dried.

The second coater 5b is located downstream of the second guide roller 4b along the feed path of the substrate 100, and is placed under a portion of the substrate 100 extending in a generally horizontal direction after being wound on the second guide roller 4b, i.e., in a direction in which the first and second guide rollers 4a and 4b are located with respect to the substrate 100. The second coater 5b contacts, from below, the second coating surface 100b of a portion of the substrate 100 traveling from the second guide roller 4b in a generally horizontal direction while being strained by applying tension to the substrate 100, and the second coating surface 100b is coated with the coating solution for forming the heat-resistant protection layers 103 such that the coating solution covers the active material layer 102, and both end portions of the metal foil 101 in the widthwise direction thereof remain uncoated.

Figure 3:
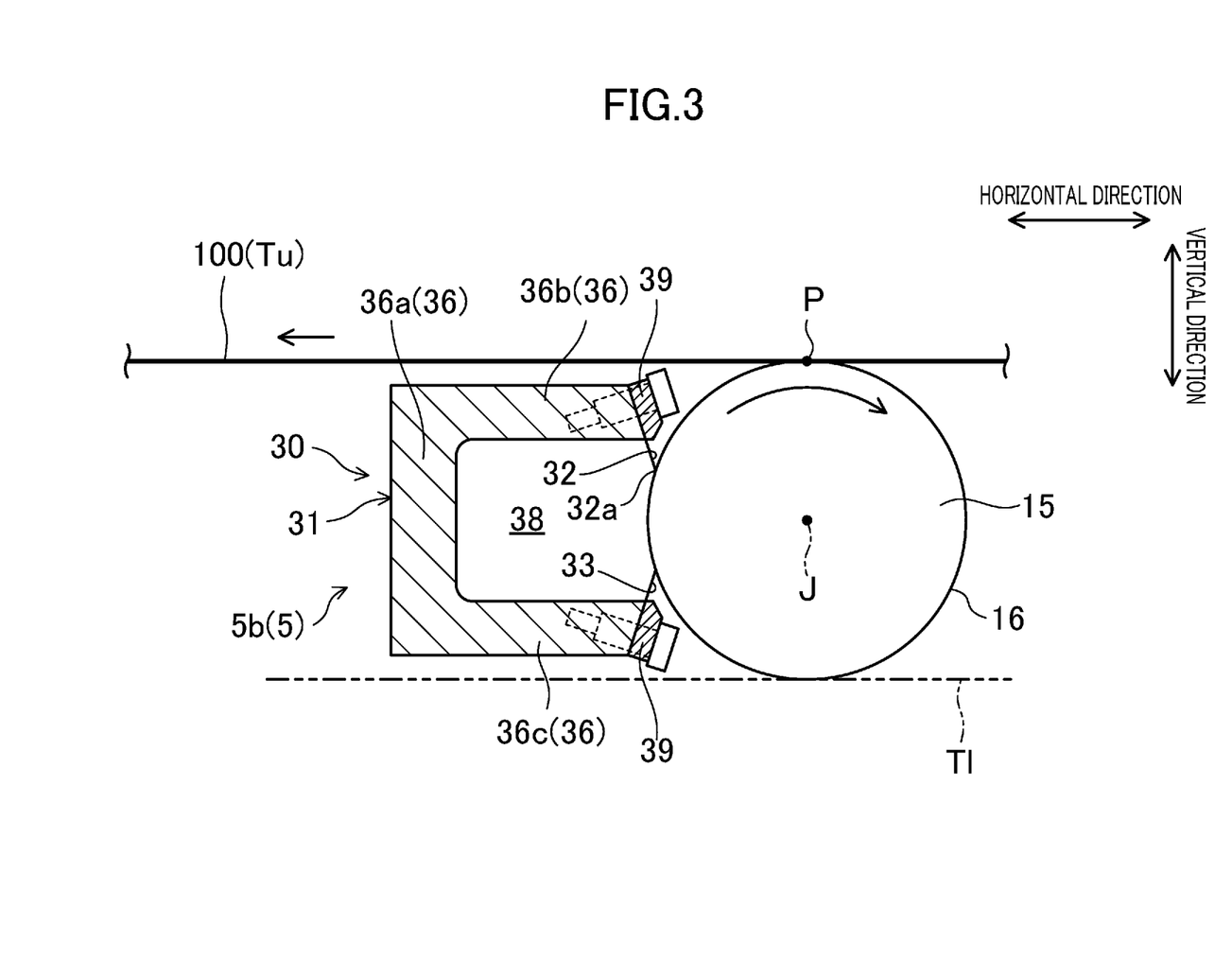
FIG. 3 is a longitudinal cross-sectional view of a coater according to the embodiment of the present disclosure.

In the dual coating system 1, the same coater (hereinafter collectively referred to as the coater) 5 is used as each of the first and second coaters 5a and 5b. FIG. 3 illustrates the configuration of the second coater 5b as an example coater 5.

As illustrated in FIG. 3, the coater 5 is a coater 5 for gravure kiss coating, and includes a small-diameter gravure roll 15 and a coating solution feeder 30. The coater 5 for gravure kiss coating is an apparatus that coats a surface of the substrate 100 with a coating solution without supporting a surface of the substrate 100 opposite to the coating target surface thereof on a back-up roll, and can more smoothly, more evenly, and more precisely coat the substrate 100 with a thinner coating solution with greater stability than a coater for another process, such as die coating.

The outside diameter D of the small-diameter gravure roll 15 is set within the range of, for example, 45-150 mm. A coating portion 16 is formed on the outer circumferential surface of the small-diameter gravure roll 15. The coating portion 16 includes cells that retain a coating solution and have a predetermined pattern. The cells correspond to engraved grooves forming a grid pattern or a diagonal shading pattern. The coating portion 16 has a width corresponding to that of a coated region R of the substrate 100 to be coated with a coating solution (see FIG. 7), and is positioned with respect to the coated region R. A coating solution is fed from the coating solution feeder 30 to the coating portion 16.

The coating solution feeder 30 is adjacent to the small-diameter gravure roll 15, and extends along the small-diameter gravure roll 15. The outer shape of the coating solution feeder 30 is elongated and prismatic. The coating solution feeder 30 includes a chamber 31, a doctor blade 32, and a seal blade 33.

As illustrated in FIGS. 2 and 3, the chamber 31 includes an elongated main case 36 being open frontward, i.e., toward the small-diameter gravure roll 15, and having a U-shaped vertical cross section, and side covers 37 placed on both ends of the main case 36. The chamber 31 includes a solution storage 38 that stores a coating solution as illustrated in FIG. 3.

The main case 36 includes a back wall portion 36a facing the small-diameter gravure roll 15 and forming an elongated strip-like shape, and an upper wall portion 36b and a lower wall portion 36c protruding from both the horizontal edges of the back wall portion 36a toward the small-diameter gravure roll 15 in parallel with each other. The upper wall portion 36b and the lower wall portion 36c each form an elongated strip-like shape, and have the same dimensions.

As illustrated in FIG. 2, the side covers 37 are each fastened to a corresponding one of the lateral ends of the main case 36 to block the corresponding lateral end of the main case 36. A front end portion of each side cover 37 toward the small-diameter gravure roll 15 includes an arcuate seal portion 37a. The seal portion 37a is fixed so as to be in close contact with the outer circumferential surface of the small-diameter gravure roll 15.

The back wall portion 36a of the main case 36 is connected to an unshown solution feed pipe and an unshown solution return pipe. The solution storage 38 in the chamber 31 communicates through both of the pipes with a storage tank that stores a coating solution. The solution storage 38, both of the pipes, and the storage tank form a circulation path for a coating solution. During operation of the coater 5, an unshown pump is driven to circulate a coating solution through the circulation path, and the coating solution is, therefore, fed through the solution feed pipe from the storage tank to the solution storage 38.

As illustrated in FIG. 3, the doctor blade 32 is an elongated blade member having one long side formed with a cutting edge. The other long side of the doctor blade 32 is bolted to a protruding end surface of the upper wall portion 36b of the chamber 31 while being pressed with a support bar 39. The protruding end surface of the upper wall portion 36b is inclined such that an edge of the protruding end surface toward the lower wall portion 36c is relatively closer to the small-diameter gravure roll 15 than an edge of the protruding end surface further from the lower wall portion 36c. Thus, a portion of the doctor blade 32 with the cutting edge near a front end thereof extends obliquely downward toward the small-diameter gravure roll 15. The front end of the doctor blade 32 is in close contact with the coating portion 16 of the small-diameter gravure roll 15.

The seal blade 33 is a member similar to the doctor blade 32, and is bolted to a protruding end surface of the lower wall portion 36c of the chamber 31 while being pressed with a support bar 39. The protruding end surface of the lower wall portion 36c is inclined such that an edge of the protruding end surface toward the upper wall portion 36b is relatively closer to the small-diameter gravure roll 15 than an edge of the protruding end surface further from the upper wall portion 36b. Thus, a portion of the doctor blade 32 with the cutting edge near a front end thereof extends obliquely upward toward the small-diameter gravure roll 15. The front end of the seal blade 33 is also in close contact with the coating portion 16 of the small-diameter gravure roll 15.

As such, both ends of the main case 36 are closed with both of the side covers 37, and the seal portions 37a of the side covers 37, the doctor blade 32, and the seal blade 33 are in close contact with the small-diameter gravure roll 15. Thus, the solution storage 38 in the chamber 31 is enclosed. For this reason, the coater 5 can be horizontally oriented such that the small-diameter gravure roll 15 and the coating solution feeder 30 are arranged in a generally horizontal direction.

When the coater 5 is horizontally oriented, the solution storage 38 is always kept filled with a coating solution. Thus, the coating solution in the solution storage 38 is always fed to the coating portion 16 of the small-diameter gravure roll 15, and is stably fed to the surface of the substrate 100 contacting the coating portion 16. In a situation where the coater 5 is horizontally oriented, the vertical size of the coating solution feeder 30 is smaller than that of the small-diameter gravure roll 15, and the coating solution feeder 30 fits behind the small-diameter gravure roll 15.

Specifically, when the horizontally oriented coater 5 is viewed along a rotation axis J of the small-diameter gravure roll 15, the uppermost end of the coating solution feeder 30 including the upper wall portion 36b, the support bar 39, bolts, and other components is below a tangent line Tu being tangent to the upper end of the small-diameter gravure roll 15, and the lowermost end of the coating solution feeder 30 including the lower wall portion 36c, the support bar 39, bolts, and other components is above a tangent line Tl being tangent to the lower end of the small-diameter gravure roll 15. In other words, the uppermost and lowermost ends of the coating solution feeder 30 are both located between the pair of tangent lines Tu and Tl being respectively tangent to the upper and lower ends of the small-diameter gravure roll 15, and a gap is formed between each tangent Tu, Tl and a corresponding one of the uppermost and lowermost ends of the coating solution feeder 30.

The horizontal orientation of the coater 1 including such a coating solution feeder 30 can ensure adequate space in a direction opposite to the coating solution feeder 30 with respect to the small-diameter gravure roll 15. The utilization of such adequate space allows the second coater 5b to be located on a region of the substrate 100 near the second guide roller 4b and downstream of the second guide roller 4b along the feed path of the substrate 100 as illustrated in FIG. 2. On the other hand, the first coater 5a is located on a region of the substrate 100 near the second guide roller 4b and upstream of the second guide roller 4b along the feed path of the substrate 100.

As such, the first and second coaters 5a and 5b are spaced apart from each other along the feed path of the substrate 100, and are separately placed upstream and downstream of the second guide roller 4b, the locations P at which the first and second coaters 5a and 5b contact the substrate 100 are close to each other, and the second guide roller 4b is located between the first coater 5a and the second coater 5b. Thus, even when the substrate 100 is displaced along the width of the substrate 100 with the feed of the substrate 100, the influence of the displacement of the substrate 100 on coating treatments of both the coaters 5a and 5b can be effectively reduced.

The dual coating system 1 of this embodiment moves the locations of portions of the substrate 100 to be coated by the coaters 5a and 5b along the width of the substrate 100 based on the locations of the edges of the active material layers 102 formed on both surfaces of the substrate 100, and thus separately adjusts the coated regions R of both surfaces of the substrate 100 to be coated within predetermined ranges. To achieve this function, the dual coating system 1 includes a first moving mechanism 45, a second moving mechanism 47, a first edge determiner 41, and a second edge determiner 43.

The first coater 5a is interposed between the first moving mechanism 45 and the second guide roller 4b along the feed path of the substrate 100. In other words, the first moving mechanism 45 is disposed at a location upstream of the first coater 5a. The first moving mechanism 45 moves the substrate 100 along the width thereof at the location to move the location of a portion of the substrate 100 to be coated by the first coater 5a along the width. Specifically, the first moving mechanism 45 includes the unwinder 2, and a first actuator 46 that moves the rolled substrate 100 supported on the support base 2a of the unwinder 2 along the width of the substrate 100 together with the support base 2a.

Although not shown, the first actuator 46 includes, for example, a servomotor serving as a power source, and a ball screw mechanism driven by the servomotor, and moves the support base 2a along the width of the substrate 100 in accordance with a command from the controller 11. In this embodiment, the rolled substrate 100 is moved along the width thereof together with the support base 2a, and is thus rotated about the second guide roller 4b so as to be shifted in the direction of the movement of the substrate 100, and the location of a portion of the substrate 100 to be coated by the first coater 5a is accordingly moved along the width of the substrate 100.

The second coater 5b is interposed between the second moving mechanism 47 and the second guide roller 4b along the feed path of the substrate 100. In other words, the second moving mechanism 47 is disposed at a location downstream of the second coater 5b. The second moving mechanism 47 moves the substrate 100 along the width thereof at the location to move the location of a portion of the substrate 100 to be coated by the second coater 5b along the width. Specifically, the second moving mechanism 47 is the end portion grasper 9 provided between the second coater 5b and the floating dryer 10.

Figure 4:
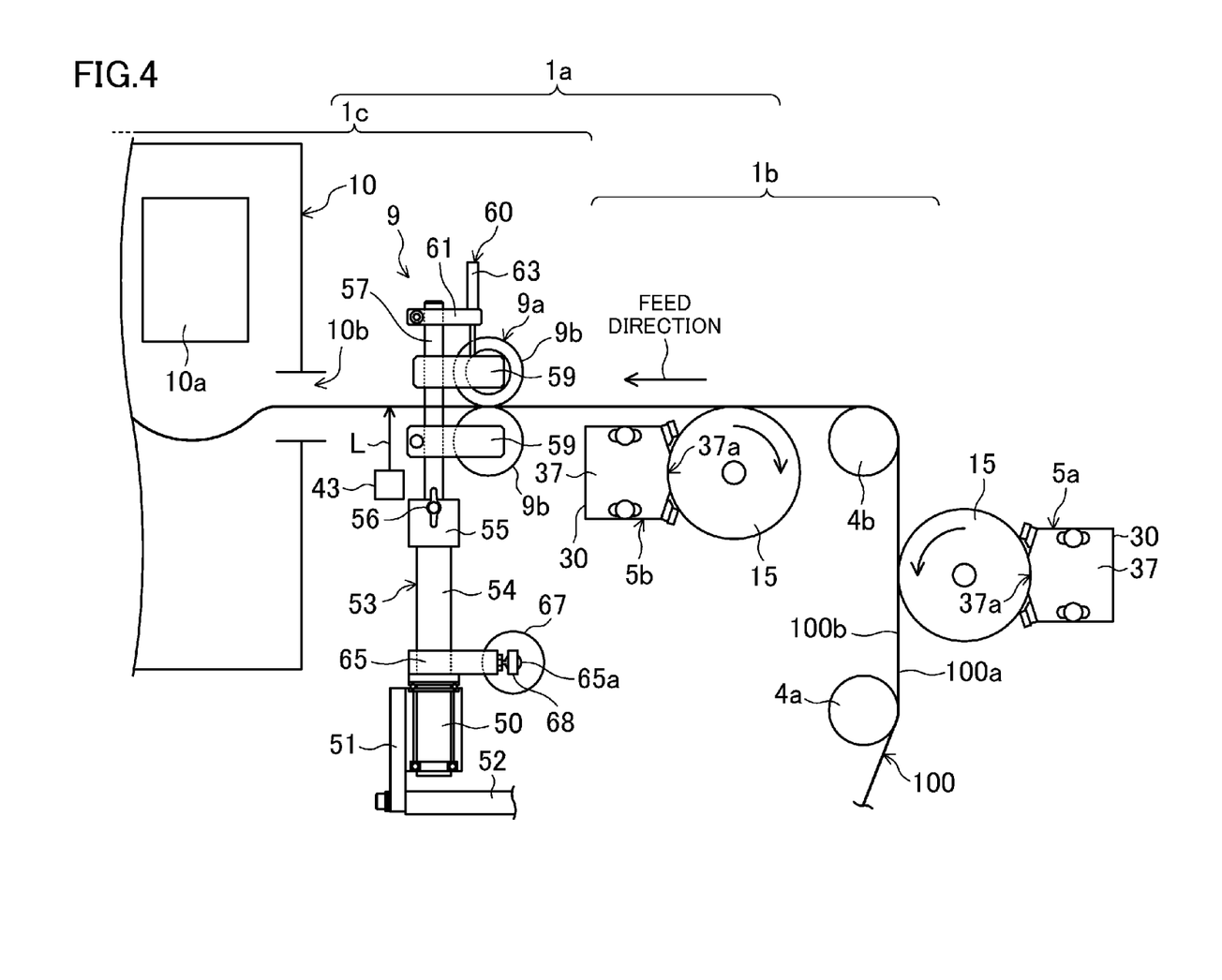
FIG. 4 is a side view illustrating a schematic configuration of an end portion grasper according to the embodiment of the present disclosure together with the coating zone.
Figure 5:
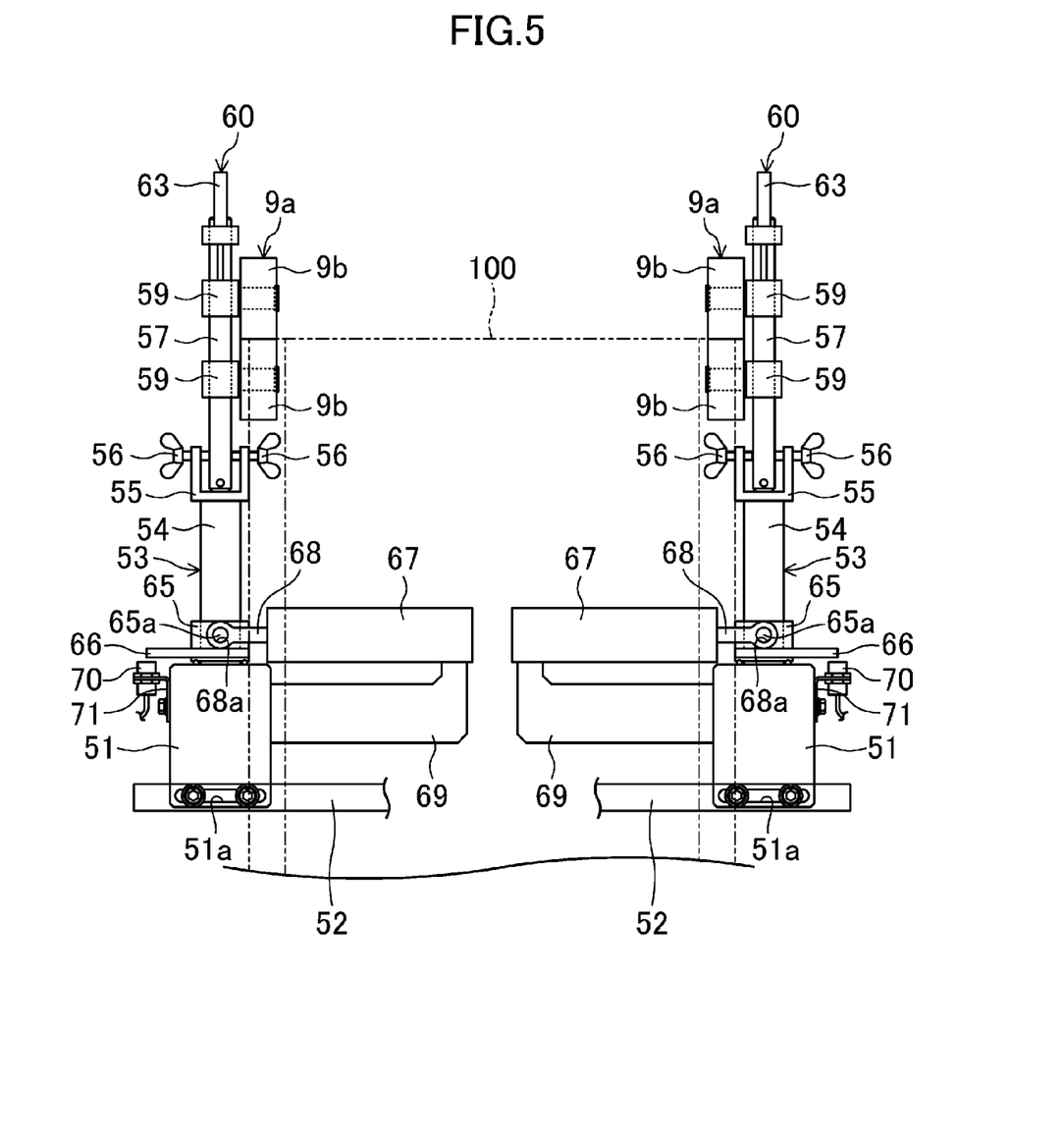
FIG. 5 is a front view illustrating a schematic configuration of the end portion grasper according to the embodiment of the present disclosure.
Figure 6:
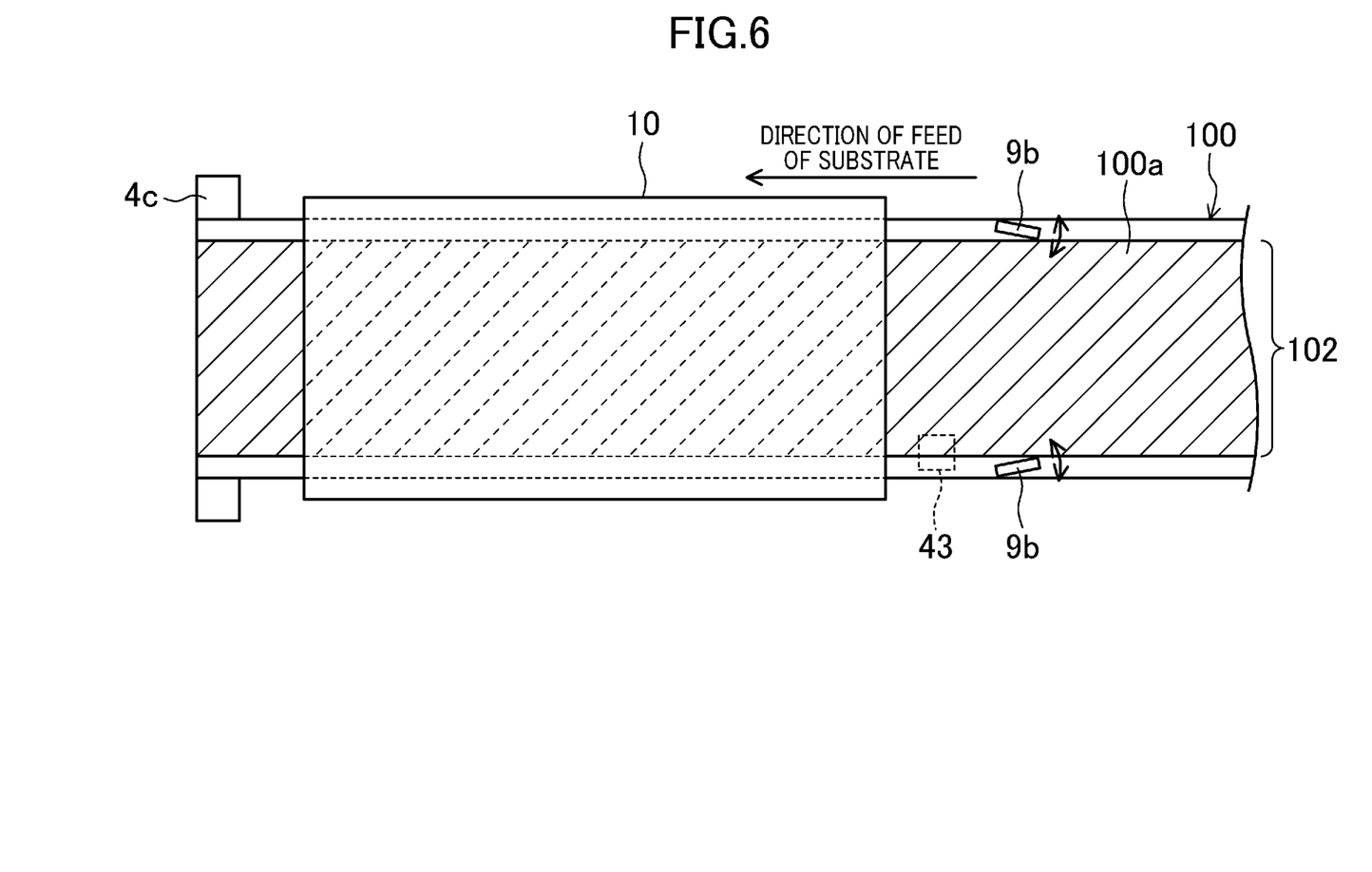
FIG. 6 is a plan view illustrating nip rollers of the end portion grasper according to the embodiment of the present disclosure when viewed from above.

FIGS. 4-6 illustrate a schematic configuration of the end portion grasper 9. FIG. 4 is a side view illustrating the end portion grasper 9 and the coating zone 1b. FIG. 5 is a front view illustrating the end portion grasper 9 when viewed downstream along the feed path of the substrate 100. FIG. 6 is a plan view illustrating nip rollers 9b of the end portion grasper 9 when viewed from above during the usual feed of the substrate 100.

As illustrated in FIGS. 4 and 5, the end portion grasper 9 includes grasp mechanisms 9a that grasp uncoated portions 100c of the substrate 100. The grasp mechanisms 9a are each disposed toward a corresponding one of both lateral ends of the substrate 100, and the total number of the grasp mechanisms 9a is two. The grasp mechanisms 9a each include a pair of vertically arranged rotatable nip rollers 9b, and while the uncoated portions 100c of the substrate 100 are each sandwiched between the pair of nip rollers 9b from both surfaces of the substrate 100, the substrate 100 is fed downstream along the feed path of the substrate 100. The two grasp mechanisms 9a are mirror images of each other, and have the same structure. Thus, only one of the grasp mechanisms 9a will now be described.

The pair of nip rollers 9b of each grasp mechanism 9a are supported by a support rod 53 extending upward from a base 50 with bearing members 59 interposed therebetween. The pair of nip rollers 9b are both made of rubber. This can ensure the griping of the substrate 100 even in a situation where the base substrate is the metal foil 101, and the displacement of the substrate 100 can be corrected. The pairs of nip rollers 9b each have a rotating shaft that is inclined such that as illustrated in FIG. 6, during the usual feed of the substrate 100, an end portion of the nip roller 9b upstream along the feed path of the substrate 100 is located relatively inwardly along the width of the substrate 100, and an end portion of the nip roller 9b downstream along the feed path of the substrate 100 is located relatively outwardly along the width of the substrate 100. Specifically, the nip rollers 9b of the grasp mechanisms 9a are arranged in a generally V shape to be open toward the floating dryer 10 when viewed from above. Thus, the end portion grasper 9 spreads the substrate 100 while feeding the substrate 100 downstream along the feed path of the substrate 100, and allows the substrate 100 to be under tension, thereby preventing wrinkles or slack in the substrate 100.

As illustrated in FIG. 5, a plate-like mounting bracket 51 is provided on a surface of each base 50 near the floating dryer 10 to protrude downward. Protruding portions of the mounting brackets 51 each have a horizontally oriented slit 51a extending in a lateral direction, i.e., along the width of the substrate 100. The mounting brackets 51 are each bolted to a stationary frame 52 through the slit 51a at a plurality of locations. The location at which each mounting bracket 51 is mounted on the stationary frame 52 can be laterally moved such that the interval between the pair of nip rollers 9b forming the grasp mechanism 9a corresponds to the width of the target substrate 100. The stationary frame 52 is fixed to an unshown stationary structure.

The support rod 53 includes a rotary rod 54 provided on the base 50 to be rotatable about the center axis of the rotary rod 54, and an inclination adjustment rod 57 having a lower end portion coupled to an upper end portion of the rotary rod 54. The upper end portion of the rotary rod 54 is provided with a retainer 55 having a recessed vertical cross section that is open upward. Both lateral walls of the retainer 55 each have a threaded hole, and threaded portions of thumbscrews 56 are each screwed from the exterior of the retainer 55 into a corresponding one of the threaded holes to penetrate the retainer 55. The lower end portion of the inclination adjustment rod 57 in the retainer 55 is supported by being laterally sandwiched between the threaded portions of the thumbscrews 56, and the degree of inclination of the inclination adjustment rod 57 with respect to the direction of feed of the substrate 100 can be adjusted in accordance with the thickness of the target substrate 100.

As illustrated in FIG. 4, the bearing members 59 are in a one-to-one correspondence with the nip rollers 9b, and extend upstream along the feed path of the substrate 100 from the inclination adjustment rod 57. A proximal end portion of each bearing member 59 includes a tubular portion through which the inclination adjustment rod 57 is inserted, and a rotating shaft of each nip roller 9b is pivotably supported on a distal end portion of a corresponding one of the bearing members 59. The bearing member 59 pivotably supporting the rotating shaft of a lower one of each pair of nip rollers 9b is fastened to a corresponding one of the inclination adjustment rods 57. On the other hand, the bearing member 59 pivotably supporting the rotating shaft of an upper one of each pair of nip rollers 9b is not fastened to a corresponding one of the inclination adjustment rods 57, and the location of the bearing member 59 can be adjusted by being slid vertically along the corresponding rod 57.

A portion of each inclination adjustment rod 57 above the upper bearing member 59 is provided with a pressing force adjustment mechanism 60 that presses the upper bearing member 59 downward. The pressing force adjustment mechanism 60 includes a supporting portion 61 which is placed on the inclination adjustment rod 57 in a manner similar to that of the bearing members 59 and the location of which can be adjusted vertically along the rod 57, and a rod-like pressing portion 63 vertically passing through the supporting portion 61 and having a lower end contacting the upper bearing member 59, adjusts the location of the supporting portion 61 in vertical directions to change the force with which the pressing portion 63 presses the upper bearing members 59 downward, and enables the adjustment of the force with which the substrate 100 is sandwiched between the pair of nip rollers 9b.

Furthermore, a rotary guiding portion 65 is fixed to a lower end portion of each rotary rod 54 as illustrated in FIGS. 4 and 5. The rotary guiding portion 65 extends upstream along the feed path of the substrate 100. A second actuator 67 below the substrate 100 is coupled to a distal end portion of the rotary guiding portion 65. The second actuator 67 is supported on the base 50 through a support bracket 69, and includes, for example, a servomotor serving as a power source, and a ball screw mechanism driven by the servomotor although not shown, and is extended or contracted along the width of the substrate 100 in accordance with a command from the controller 11.

A plate-like connection rod 68 stands on an end portion of each second actuator 67 near the rotary guiding portion 65 to extend laterally outward of the substrate 100. A distal end portion of the connection rod 68 has a circular fitting hole 68a passing through the connection rod 68 in the direction of feed of the substrate 100. On the other hand, a distal end portion of the rotary guiding portion 65 is provided with a sphere 65a. The sphere 65a is fitted into the fitting hole 68a of the distal end portion of the connection rod 68 so as to be rotatably supported, and the rotary guiding portion 65 is thus coupled to the connection rod 68.

In each grasp mechanism 9a having the configuration, when the second actuator 67 extends or contracts, the linear motion of the connection rod 68 is converted into rotary motion thereof by the rotary guiding portion 65, the support rod 53 rotates, and the pair of nip rollers 9b revolve to change the orientations of the rotating shafts of the nip rollers 9b. Thus, the rotating shafts of the pair of nip rollers 9b are each inclined with respect to the orientation of the shaft during the usual feed of the substrate 100 while being parallel to the direction of feed of the substrate 100, and the direction in which the pair of nip rollers 9b guide the substrate 100 is thus changed in lateral directions within a predetermined angle range. In this embodiment, the two grasp mechanisms 9a change the direction of guiding of the substrate 100 in synchronization with each other to slightly turn the substrate 100 about the second guide roller 4b in the changed direction of guiding of the substrate 100, and the location of a portion of the substrate 100 to be coated by the second coater 5b is accordingly moved along the width of the substrate 100.

The second actuators 67 of the grasp mechanisms 9a in this embodiment are independently controlled by the controller 11, and the angles by which the locations of the rotating shafts of the pairs of nip rollers 9b of the left and right grasp mechanisms 9a are changed can vary. This permits an accurate change in direction of guiding of the substrate 100, and enables the precise alignment of the coated regions R with the active material layers 102 on both surfaces of the substrate 100 during the feed of the substrate 100.

The first edge determiner 41 is a sensor that determines the locations of the lateral edges of the active material layer 102 formed on the first coating surface 100a of the substrate 100 to be coated by the first coater 5a. The first edge determiner 41 is located between the feed mechanism 2b and the first guide roller 4a in the direction in which the first coater 5a is located with respect to the substrate 100.

The second edge determiner 43 is a sensor that determines the locations of the lateral edges of the active material layer 102 formed on the second coating surface 100b of the substrate 100 to be coated by the second coater 5b. Since the second edge determiner 43 according to this embodiment is located downstream of the second coater 5b along the direction of feed of the substrate 100, the second edge determiner 43 determines the locations of steps between a portion of the substrate 100 coated with a coating solution by the second coater 5b and including the active material layer 102 and a portion thereof that does not include the active material layer 102 as the locations of the lateral edges of the active material layer 102. The second edge determiner 43 is located between the end portion grasper 9 and the floating dryer 10 in the direction in which the second coater 5b is located with respect to the substrate 100.

The first and second edge determiners 41 and 43 are connected to the controller 11 to each transmit a signal indicating the determined locations of the edges of the active material layer 102 to the controller 11. Preferred examples of both the edge determiners 41 and 43 include an optical reflective location determination sensor that emits light L to the substrate 100 and determines the locations of the edges of the active material layer 102 based on the intensity of the reflected light.

The controller 11 receives the signal indicating the locations of the edges of the active material layer 102 determined by the first edge determiner 41, and when the determined locations are displaced from reference locations, drives the first moving mechanism 45 (the first actuator 46) to thereby move the substrate 100 in a direction opposite to the direction of displacement of the locations of the edges of the active material layer 102 along the width of the substrate 100 such that the location of the coated region R of the first coating surface 100a of the substrate 100 is within a predetermined range with respect to the active material layer 102. Furthermore, the controller 11 receives the signal indicating the locations of the edges of the active material layer 102 determined by the second edge determiner 43, and when the determined locations are displaced from reference locations, drives the second moving mechanism 47 (the second actuator 67) to thereby move the substrate 100 in a direction opposite to the direction of displacement of the locations of the edges of the active material layer 102 along the width of the substrate 100 such that the location of the coated region R of the second coating surface 100b of the substrate 100 is within a predetermined range with respect to the active material layer 102. The controller 11 enables the application of a coating solution onto both surfaces of the substrate 100 with high alignment precision with respect to the active material layer 102.

Each end portion grasper 9 includes a center position determiner 70 that is fastened to the base 50 through a mounting plate 71 having an inverted L-shaped vertical cross section as illustrated in FIG. 5 to reset the pair of nip rollers 9b revolved by the second actuator 67 to their initial positions. A position determination protruding piece 66 is fixed to a proximal end portion of each rotary rod 54. The protruding piece 66 protrudes laterally outward of the rod 54, and has a distal end portion located over the center position determiner 70 during the usual feed of the substrate 100. The rotation of the rotary rod 54 allows the protruding piece 66 to rotate together with the rod 54, and when the rotating shafts of the pair of nip rollers 9b are inclined from the orientations of the rotating shafts during the usual feed of the substrate 100, the protruding piece 66 is outside a region that can be determined by the center position determiner 70.

The center position determiner 70 transmits a signal indicating whether or not the protruding piece 66 has been detected to the controller 11. When a user inputs a command for resetting the pair of nip rollers 9b to their initial positions through an unshown operation panel to the controller 11, the controller 11 drives the second actuator 67 based on the signal from the center position determiner 70 to thereby rotate the support rod 53, and thus resets the pair of nip rollers 9b to their initial positions.

The substrate 100 both surfaces of which have been coated in the coating zone 1b is immediately fed to the floating dryer 10 in the drying zone 1c, and is dried.

The floating dryer 10 is a known horizontally oriented dryer, and while the substrate 100 both surfaces of which have been coated with a coating solution is fed, the floating dryer 10 can dry the substrate 100. Air blowers 10a are vertically staggered inside the floating dryer 10 to blow dry air to the substrate 100. An upstream end portion of the floating dryer 10 has an entrance 10b through which the substrate 100 is fed into the floating dryer 10, and a downstream end portion of the floating dryer 10 has an exit 10c through which the substrate 100 is fed out of the floating dryer 10. The floating dryer 10 dries the coating solution on both surfaces of the substrate 100 to form the heat-resistant protection layers 103.

A third guide roller 4c is provided outside the floating dryer 10 and in the vicinity of the exit 10c. The third guide roller 4c supports the substrate 100 fed through the exit 10c of the floating dryer 10, and guides the substrate 100 to the winder 3.

The winder 3 includes a support base 3a winding the substrate 100 into a roll and supporting the substrate 100, and a downstream feed mechanism 3b drawing the substrate 100 from the treatment zone 1a into the support base 3a in synchronization with the support base 3a, and operates in conjunction with the unwinder 2. The downstream feed mechanism 3b includes a pair of drawing rollers 3c between which both surfaces of the substrate 100 are sandwiched.

The pair of drawing rollers 3c are rotated in opposite directions to thereby draw the substrate 100 toward the support base 3a of the winder 3 at a fixed speed, and the substrate 100 having both surfaces on each of which the heat-resistant protection layer 103 has been formed is collected by being wound around a core placed on the support base 3a.

Advantages of Embodiment

According to this embodiment, when the locations of the edges of the active material layer 102 determined by the first edge determiner 41 are displaced from the reference locations, the first moving mechanism 45 is driven to move the substrate 100 along the width of the substrate 100. This allows the location of the coated region R that is to be coated with a coating solution for forming the heat-resistant protection layers 103 by the first coater 5a to be within a predetermined range with respect to the active material layer 102. Furthermore, when the locations of the edges of the active material layer 102 determined by the second edge determiner 47 are displaced from the reference locations, the second moving mechanism 47 is driven to move the substrate 100 along the width of the substrate 100. This allows the location of the coated region R that is to be coated with a coating solution for forming the heat-resistant protection layers 103 by the second coater 5b to be within a predetermined range with respect to the active material layer 102. Thus, the heat-resistant protection layers 103 are formed on both surfaces of the substrate 100 with high alignment precision with respect to the previously formed active material layers 102, thereby fabricating a battery electrode material of high quality.

According to the embodiment, the first moving mechanism 45 includes the unwinder 2, and the first actuator 46 that moves the rolled substrate 100 along the width of the substrate 100 together with the support base 2a of the unwinder 2. This enables the accurate and rapid movement of the substrate 100 along the width thereof. The unwinder 2 functioning as the first moving mechanism 45 and the end portion grasper 9 functioning as the second moving mechanism 47 render the system configuration simpler than when the first and second moving mechanisms 45 and 47 are provided separately from the unwinder 2 and the end portion grasper 9, respectively.

While, in the embodiment, the first coater 5a is located upstream along the feed path of the substrate 100, and the second coater 5b is located downstream along the feed path of the substrate 100, the second coater 5b may be located upstream along the feed path of the substrate 100, and the first coater 5a may be located downstream along the feed path of the substrate 100.

While, in the embodiment, the first edge determiner 41 is located upstream of the first coater 5a along the direction of feed of the substrate 100, and the second edge determiner 43 is located downstream of the second coater 5b along the direction of feed of the substrate 100, the present disclosure is not limited to the locations. The first edge determiner 41 may be located downstream of the first coater 5a along the direction of feed of the substrate 100, for example, between the first coater 5a and the second guide roller 4b, and the second edge determiner 43 may be located upstream of the second coater 5b along the direction of feed of the substrate 100, for example, between the second guide roller 4b and the second coater 5b.

While, in the embodiment, an optical reflective location determination sensor is preferably used as each of the first and second edge determiners 41 and 43, the edge determiners according to the present disclosure are not limited to the optical reflective location determination sensor. As long as the locations of the edges of the active material layers 102 previously formed on the substrate can be determined, cameras having a resolution allowing the edges of the active material layer 102 to be determined by image processing, or other types of location determination sensors, such as an ultrasonic location determination sensor, for example, can be used.

In the embodiment, the first moving mechanism 45 includes, but not limited to, the unwinder 2 and the first actuator 46, and the second moving mechanism 47 includes, but not limited to, the end portion grasper 9. The first moving mechanism 45 may include, for example, the feed mechanism 2b, and an actuator that changes the orientations of the rotating shafts of the pair of feed rollers 2c of the feed mechanism 2b, and the direction in which the feed mechanism 2c feeds the substrate 100 may be changed to move the location of a portion of the substrate 100 to be coated by the first coater 5a along the width of the substrate 100. Alternatively, the first moving mechanism 45 may include an end portion grasper similar to the second moving mechanism 47 of the embodiment, or may have a different configuration. The second moving mechanism 47 may include, for example, the second guide roller 4b, and an actuator that changes the orientation of the rotating shaft of the second guide roller 4b, and the direction in which the second guide roller 4b guides the substrate 100 may be changed to move the location of a portion of the substrate 100 to be coated by the second coater 5b along the width of the substrate 100. Alternatively, the second moving mechanism 47 may have a different configuration.

Additionally, in the embodiment, examples of the target substrate 100 include, but not limited to, a substrate including the metal foil 101 having both surfaces on each of which the active material layer 102 is previously formed. A first coating layer merely needs to be previously formed on each surface of the metal foil 101 or another base substrate by coating so as to be spaced inwardly from both lateral ends of the metal foil 101 or the another base substrate.

As described above, the present disclosure is useful for a dual coating system that feeds a long substrate including a base substrate having both surfaces on each of which a first coating layer is previously formed so as to be spaced inwardly from both lateral ends of the substrate, and simultaneously forms a second coating layer covering the first coating layer on each surface of the substrate so as to be spaced inwardly from both ends of the base substrate, and is suitable for, in particular, a dual coating system required to form a second coating layer on each surface of the substrate with adequate alignment precision with respect to a corresponding one of the previously formed first coating layers to fabricate a coated product of high quality.

What is claimed is:

1. A dual coating system that feeds a long substrate including a base substrate having both surfaces on each of which a first coating layer is previously formed so as to be spaced inwardly from both lateral ends of the substrate, and simultaneously forms a second coating layer covering the first coating layer on each surface of the substrate so as to be spaced inwardly from both ends of the base substrate, the system comprising:
   a plurality of guide rollers configured to feed the substrate by a roll-to-roll process;
   a first coater and a second coater spaced apart from each other in a direction of feed of the substrate, and configured to apply a coating solution for forming the second coating layer onto both surfaces of the substrate both surfaces already coated by a first coating layer, the substrate fed by the guide rollers such that the coating solution covers the first coating layers, and both lateral end portions of the base substrate remain uncoated to form uncoated portions;

a first moving mechanism to move a location of a portion of the substrate to be coated by the first coater along a width of the substrate;

a second moving mechanism to move a location of a portion of the substrate to be coated by the second coater along the width of the substrate;

a first edge determiner to determine locations of lateral edges of the first coating layer formed on one surface of the substrate to be coated by the first coater;

a second edge determiner to determine locations of lateral edges of the first coating layer formed on the other surface of the substrate to be coated by the second coater; and a controller configured to, when the locations of the lateral edges of the first coating layer determined by the first edge determiner are displaced from reference locations, drive the first moving mechanism to move the substrate along the width of the substrate such that a location of a coated region of one surface of the substrate to be coated with the coating solution is within a predetermined range with respect to the first coating layer, and when the locations of the lateral edges of the first coating layer determined by the second edge determiner are displaced from reference locations, drive the second moving mechanism to move the substrate along the width of the substrate such that a location of a coated region of the other surface of the substrate to be coated with the coating solution is within a predetermined range with respect to the first coating layer.

2. The dual coating system of claim 1, wherein
the guide rollers include a direction change roller on which the substrate is wound and which is configured to change the direction of feed of the substrate,
the first and second coaters are separately located upstream and downstream of the direction change roller,
the first coater is interposed between the first moving mechanism and the direction change roller along a substrate feed path,
the first moving mechanism moves the substrate along the width of the substrate,
the second coater is interposed between the second moving mechanism and the direction change roller along the substrate feed path,
the second moving mechanism moves the substrate along the width of the substrate,
the first edge determiner determines the locations of the edges of a corresponding one of the first coating layers at a location closer to the first moving mechanism than the first coater, and
the second edge determiner determines the edges of a corresponding one of the first coating layers at a location closer to the second moving mechanism than the second coater.

3. The dual coating system of claim 1 further comprising:
an unwinder configured to support the substrate wound into a roll, and unwind the substrate toward the guide rollers, wherein
one of the first and second moving mechanisms upstream along a substrate feed path includes the unwinder, and an actuator configured to move the rolled substrate supported on the unwinder along the width of the substrate.

4. The dual coating system of claim 1 further comprising:
a floating dryer configured to dry the substrate having both surfaces coated with the coating solution for forming the second coating layer; and
pairs of nip rollers each placed on a corresponding one of both lateral end portions of the substrate between the floating dryer and one of the first and second coaters downstream along a substrate feed path, and configured to feed the substrate downstream along the substrate feed path, a corresponding one of the uncoated portions of the substrate being sandwiched between each pair of the nip rollers from both surfaces of the substrate, wherein
one of the first and second moving mechanisms downstream along the substrate feed path includes the pairs of nip rollers, and an actuator configured to incline rotating shafts of the pairs of nip rollers from orientations of the rotating shafts during usual feed of the substrate to change a direction in which the pairs of nip rollers guide the substrate.

5. The dual coating system of claim 1, wherein
the first and second coaters are gravure kiss coaters.

* * * * *